R. HACKBARTH.
CAR AXLE COUPLING.
APPLICATION FILED NOV. 21, 1908.
928,445.  Patented July 20, 1909.
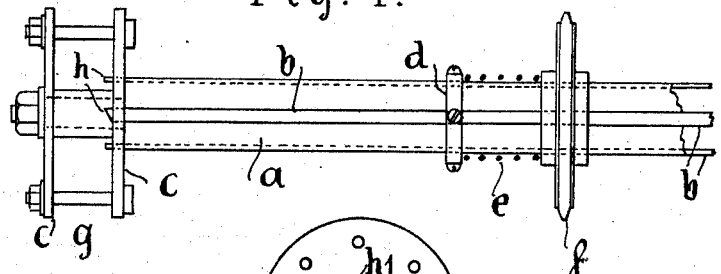
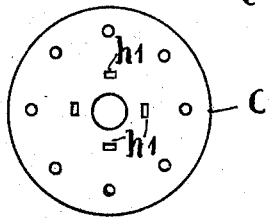
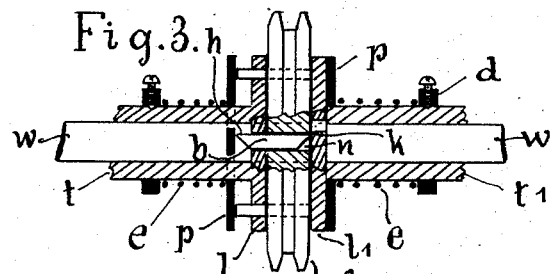
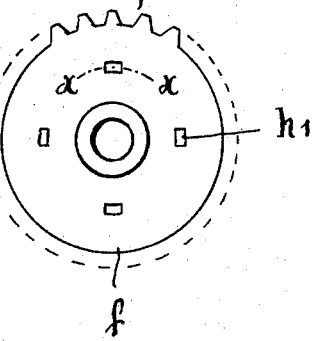
Witnesses:
G. A. Marvin.
K. P. Howard
Inventor:
Richard Hackbarth,
by T. Woodmans, Atty.
ANDREW. B. GRAHAM CO., PHOTO-LITHOGRAPHERS, WASHINGTON, D. C.

UNITED STATES PATENT OFFICE.

RICHARD HACKBARTH, OF BAUMSCHULENWEG, NEAR BERLIN, GERMANY.

CAR-AXLE COUPLING.

No. 928,445.          Specification of Letters Patent.          Patented July 20, 1909.

Application filed November 21, 1908. Serial No. 463,861.

*To all whom it may concern:*

Be it known that I, RICHARD HACKBARTH, a subject of the German Emperor, and residing at Baumschulenweg, near Berlin, Germany, have invented certain new and useful Improvements in Car-Axle Couplings, of which the following is a specification.

The subject-matter of the present invenvention is an improved car-axle coupling for motor-driven vehicles; the new coupling has displaceable spring-pressed coupling members which are provided with beveled teeth or claws for engaging in the hubs of the driving wheels of the vehicle.

The invention substantially consists in the teeth or claws, which serve for coupling the two driving wheels of the vehicle with the chain-driven sprocket-wheel, being provided on the ends of movable rods which are connected rigidly one with another and which are held in the coupling position by means of springs arranged on both sides of the sprocket-wheel, so that, when the coupling drives both hubs with the beveled faces of its teeth when the vehicle is driven backward, the rods cannot be disengaged from the hubs in consequence of the lateral pressures of the springs on both sides which cancel one another as long as both the car-wheels run backward equally rapidly; on the contrary, when running around a curve, the rods are automatically uncoupled from the car-wheel which runs slower during the backward motion. Consequently such a coupling common to the two wheels can both drive and admit of the speed of the wheels being equalized when it is driven backward. When arranged in a certain manner couplings known heretofore which also have beveled teeth acting in one direction only enable the car-wheels to rotate backward, but do not admit of the speed of both wheels being equal when traveling backward around a curve, which is important in practice because particularly when traveling backward do the car-wheels have to run in curves of short radii.

In order that the invention may be clearly understood reference will be made to the accompanying drawing in which two embodiments are represented by way of example, and in which:

Figure 1 is a plan, partly in section, of one form, and Fig. 2 is a cross-section through the same, whereas Fig. 3 is a horizontal section in two different planes through a modified form, and Fig. 4 is a cross-section through the same as seen in the direction of the sprocket-wheel.

In Fig. 1 only one half of the coupling is shown in its entirety as the other half is identical with this.

Referring to the drawing and firstly to Figs. 1 and 2, at each end of the axle $a$ there is mounted a driving car-wheel which is not shown in the drawing, the hub of which is adapted to be held between plates $c$ by means of bolts $g$. The inner plate $c$ is provided with cavities or holes $h_1$ in which the beveled teeth $h$ of the movable coupling rods $b$ engage; these rods are arranged displaceable longitudinally on each side of the sprocket-wheel $f$ and are connected with one another by a ring $d$, so that they cannot rotate with regard to the sprocket-wheel but are movable axially. A spiral spring $e$ is arranged between the sprocket-wheel $f$ and each ring $d$. These two springs normally hold the coupling rods $b$ in the central position in engagement with both hubs. When the vehicle is driven forward the coupled wheel is driven by the rods $b$ as in an ordinary clutch-coupling. These rods $b$ extend, preferably in grooves as clearly shown in Fig. 1, along the entire length of the axle from the one hub to the other. Consequently both wheels are driven simultaneously from the one gear-wheel and nevertheless can rotate at different rates in consequence of this coupling. Namely, when traveling around a curve the beveled teeth which are in engagement with the wheel which is running forward more rapidly than the other are pressed out of the holes $h_1$ in the disk $c$ and allow the wheel describing the greater arc to lead, whereas the wheel running more slowly at the other end of the shaft remains coupled with the sprocket-wheel by the rods $b$. But also when driven backward the coupling both drives one or both of the wheels and admits of the speeds of the wheels being equal. Namely, although when running backward the slanting faces of the teeth lie against the appertaining walls of the holes $h_1$ in the disk or plate $c$, the coupling rods $b$ cannot be moved axially so long as both the car-wheels run backward at an equal speed. But as soon as the one car-wheel runs backward on a curve slower than the other, this central position of the coupling rods is done away with; the coupling rods $b$ become uncoupled from the car-wheel which runs more slowly than the other, so that the one wheel can lag behind whereas the other remains coupled.

The modified constructional form shown in Figs. 3 and 4 differs from that above described only by the coupling proper being confined to the center of the axle, the coupling rods being made short whereas the hubs of the wheels on the contrary are extended in the form of hollow shafts up to the coupling.

Fig. 3 is shown partly in section in the plane $x$—$x$ in Fig. 4. The hubs of the driving wheels of the vehicle which are not shown in the drawing are attached on the hollow shafts $t$ and $t_1$ arranged loosely on the shaft $w$, and these hollow shafts extend up to the sprocket-wheel $f$ and terminate in flanges $l$, $l_1$. The latter and also the sprocket-wheel $f$ are provided with holes $n$ for receiving the short coupling rods $b$ which normally take up a central position and drive both the car-wheels when the vehicle travels straight forward, since they pass through the holes in the flange $l$, sprocket-wheel $f$ and flange $l_1$. As soon as the one car-wheel, for example the right-hand wheel, runs forward more rapidly than the other when describing a curve, the edges $k$ of the right-hand flange $l_1$ which act on the slanting faces of the rods $b$ press the coupling rods to the left against the pressure of the left-hand spiral spring $e$ into the position in which they are shown. A displaceable, annular disk $p$ is placed between the coupling rods $b$ and each of these springs $e$ which abut against a collar $d$ on the appertaining hollow shaft.

What I claim as my invention and desire to secure by Letters Patent is:

1. In a car-axle driving-coupling of the character described, the combination, with the axle and a driving wheel fixed thereon, of hub-carrying means revoluble on said axle, and a plurality of spring-pressed members adapted to be driven by said driving wheel, having beveled ends adapted to engage in holes in and drive said hub-carrying means, and movable longitudinally of said axle and out of engagement with said hub-carrying means.

2. In a car-axle driving-coupling of the character described, the combination, with the axle and a sprocket-wheel fixed thereon, of two plates bolted together revoluble on one end of said axle; and a plurality of spring-pressed bars passing through and adapted to be driven by said sprocket-wheel, having beveled ends normally in cavities or holes in the inner plate, and movable longitudinally of said axle and out of said plate.

3. In a car-axle driving-coupling of the character described, the combination, with the axle and a sprocket-wheel fixed thereon, of two plates bolted together revoluble on one end of said axle, the inner plate having a plurality of holes through the same; a plurality of spring-pressed bars passing through and adapted to be driven by said sprocket-wheel, having beveled ends normally in holes in the inner plate, and movable longitudinally of said axle and out of said plate; and a ring attached to said bars.

4. In a car-axle driving-coupling of the character described, the combination, with the axle and a sprocket-wheel fixed thereon, of two plates bolted together revoluble on one end of said axle; a plurality of bars passing through said sprocket-wheel and having beveled ends normally in holes in the inner plate and movable longitudinally of said axle; a ring attached to said bars, and a spring compressed between said ring and said sprocket-wheel.

5. In a car-axle driving-coupling of the character described, the combination, with an axle and a driving wheel fixed on the center thereof, of a plurality of spring-pressed bars passing through said driving wheel and slidable axially along the periphery of said axle, as set forth, for the purpose specified.

6. In a car-axle driving-coupling of the character described, the combination of an axle having a plurality of longitudinal grooves in its periphery, a sprocket-wheel fixed on said axle, a bar slidable in each of said grooves and passing through said sprocket-wheel, a ring around said axle and attached to said bars, and a spiral spring between said ring and said sprocket-wheel.

In testimony whereof, I affix my signature in the presence of two witnesses.

RICHARD HACKBARTH.

Witnesses:
  WOLDEMAR HAUPT,
  HENRY HASPER.